(12) United States Patent
Carey

(10) Patent No.: US 6,201,195 B1
(45) Date of Patent: *Mar. 13, 2001

(54) PATIENT HOIST AND SCALE

(75) Inventor: Kevin Carey, Bettendorf, IA (US)

(73) Assignee: Medcare Products, Inc., Burnsville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/281,456

(22) Filed: Mar. 30, 1999

Related U.S. Application Data

(63) Continuation of application No. 08/794,680, filed on Feb. 3, 1997, now Pat. No. 5,892,180.

(51) Int. Cl.[7] .......................... G01G 19/52; G01G 19/14
(52) U.S. Cl. ........................ 177/144; 177/147; 177/245
(58) Field of Search ................................ 177/144, 147, 177/229, 245

(56) References Cited

U.S. PATENT DOCUMENTS

| 2,990,899 | 7/1961 | DaBella | 177/139 |
|---|---|---|---|
| 3,338,323 | 8/1967 | Swersey | 177/245 |
| 3,998,284 | 12/1976 | James | 177/147 |
| 4,482,783 | 11/1984 | Laimins | 177/147 |
| 4,799,562 | 1/1989 | Burrows et al. | 177/144 |
| 4,926,951 | 5/1990 | Carruth et al. | 177/229 |
| 5,022,106 | 6/1991 | Richards | 5/86 |
| 5,033,563 | 7/1991 | Brainerd, Jr. et al. | 177/147 |
| 5,174,399 | * 12/1992 | Brauneis | 177/145 |
| 5,906,016 | * 5/1999 | Ferrand et al. | 177/144 |

OTHER PUBLICATIONS

*Medcare Lifts & Stands, Operator's Manual*; Medcare Products, No Date Given.

* cited by examiner

*Primary Examiner*—Randy W. Gibson
(74) *Attorney, Agent, or Firm*—Woodard, Emhardt, Naughton Moriarty & McNett

(57) ABSTRACT

A patient hoist having a base, a load sensor mounted to the base and a mast assembly including an elevation arm and a body support member extending from the load sensor. The patient hoist is used to determine a patient's weight while the patient is assisted to a standing position or suspended.

8 Claims, 5 Drawing Sheets

PATIENT HOIST AND SCALE

This application is a continuation application of application Ser. No. 08/794,680 filed Feb. 3, 1997, now issued as U.S. Pat. No. 5,892,180.

BACKGROUND OF THE INVENTION

The present invention relates to a patient hoist, and more particularly, relates to a way to determine the weight of a patient supported by a patient hoist.

FIELD OF THE INVENTION

In the healthcare field, it is often desirable to assist a patient to a standing or suspended position. This is particularly needed to help support the infirm or disabled who may lack the strength or coordination to raise themselves. To assist in supporting these patients, it is common to have a patient hoist which is a lift or a stand. A caregiver is normally required to assist a patient in using a lift or stand.

A lift is a patient hoist, where a patient is placed in a sling or stretcher on a bed or chair, and is then lifted by a mobile arm-type of device. In a lift, the patient is completely supported from an overhead position, and has no active role in supporting themselves or assisting in being raised. A lift is used to temporarily raise a patient or transport them without discomfort. Such a lift is illustrated in U.S. Pat. No. 4,482,783.

A stand is a different type of patient hoist which is used to raise a patient from a sitting position to a generally standing position. A stand is normally smaller than a lift, with an upright member and a pivotably mounted arm or support member moved by an elevation arm or actuator. When supported by a stand, the patient stands at an angle, and holds support bars.

A strap-type sling is normally used with a stand to assist in supporting a patient. The sling goes behind the patient's back and under the patient's arms and is then suspended from the stand. The patient is then lifted to a generally erect position. Once the patient is lifted, the stand may be moved to reposition the patient to a new desired location or other patient care procedures such as changing clothes or toileting may be done. Alternatively, the patient may step off of the stand and walk away. Such a stand is illustrated in U.S. Pat. No. 5,022,106.

A stand may also be used with a larger sling to raise and suspend the patient; however, a lift is normally more efficient for this operation. Another alternative is to lower a stand's support bars to a comfortable hand level and remove the foot plate, the stand may be used to assist the patient in walking.

In addition to helping support and transport patients, nursing facilities also have a need to weigh patients on a regular and frequent basis. If the weighing activity can be combined with a patient transfer, a weighing step is eliminated which reduces the discomfort of the patient and saves the caregiver time and labor.

It has been known to incorporate a weighing system or scales into a patient lift where the patient is completely suspended from a mobile arm. These lifts generally show scales mounted at the end of the mobile arm directly over the patient or directly supporting the mobile arm.

However, there have been a number of drawbacks in attempts to incorporate a weighing system with a patient stand. Thus, a separate weighing step has been required. This requires additional time and effort for the caregiver and can cause additional discomfort to the patient. There is a need for a manner to accurately measure a patient's weight on a patient stand since the patient is generally standing at an angle, and is holding hand-holds, thus dissipating the patient's weight.

SUMMARY OF THE INVENTION

The present invention is a patient hoist configured to measure a patient's weight. The patient hoist is used to assist the patient from a generally sitting to a generally standing position or alternately to suspend the patient. The patient hoist has a base, a load sensor mounted to the base, and a mast assembly bearing on the load sensor. Once the hoist is adjacent to the patient, the patient is placed in a sling, and assisted to a standing position or suspended. The hoist may then be moved to reposition the patient, and the weight of the patient can be determined from the load sensor and an attached display. Once relocated or weighed, the patient can be lowered and assisted to a new position.

Accordingly, it is an object of the present invention to provide a patient hoist to assist in supporting infirm or disabled patients.

A further object of the invention is to provide a scale wherein the patient's weight may be measured while the patient is being supported by the hoist.

It is a further object of certain embodiments of this invention to accurately measure the patient's weight while the patient is standing generally at an angle, and holding hand-holds.

Another object of the present invention is to provide a patient weighing device wherein the patient is not discomforted, and the weighing involves a minimal amount of time and effort for the caregiver.

Further objects, features, and advantages of the present invention shall become apparent from the detailed drawings and descriptions provided herein.

DESCRIPTION OF THE PREFERRED EMBODIMENTS

Figure 1:
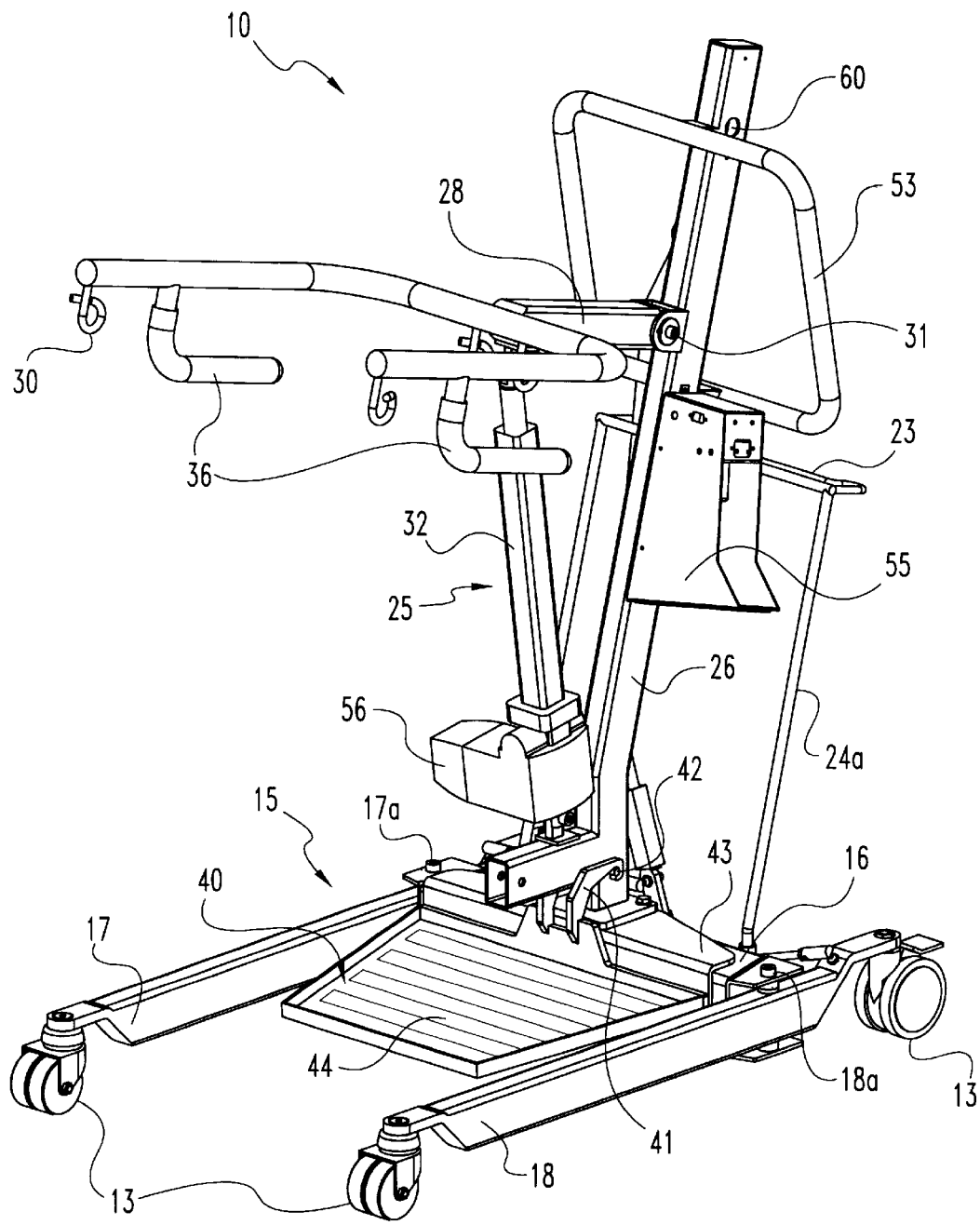
FIG. 1 is a perspective view of a preferred embodiment of the invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described device, and any further applications of the principles of the invention as described herein are contemplated as would normally occur to one skilled in the art to which the invention relates.

The patient hoist of the present invention allows a caregiver to assist a patient from a generally sitting position to a generally standing position or to completely suspend the patient. The present invention incorporates a scale or load sensor to accurately measure the patient's weight while the patient is supported by the patient hoist.

Figure 2:
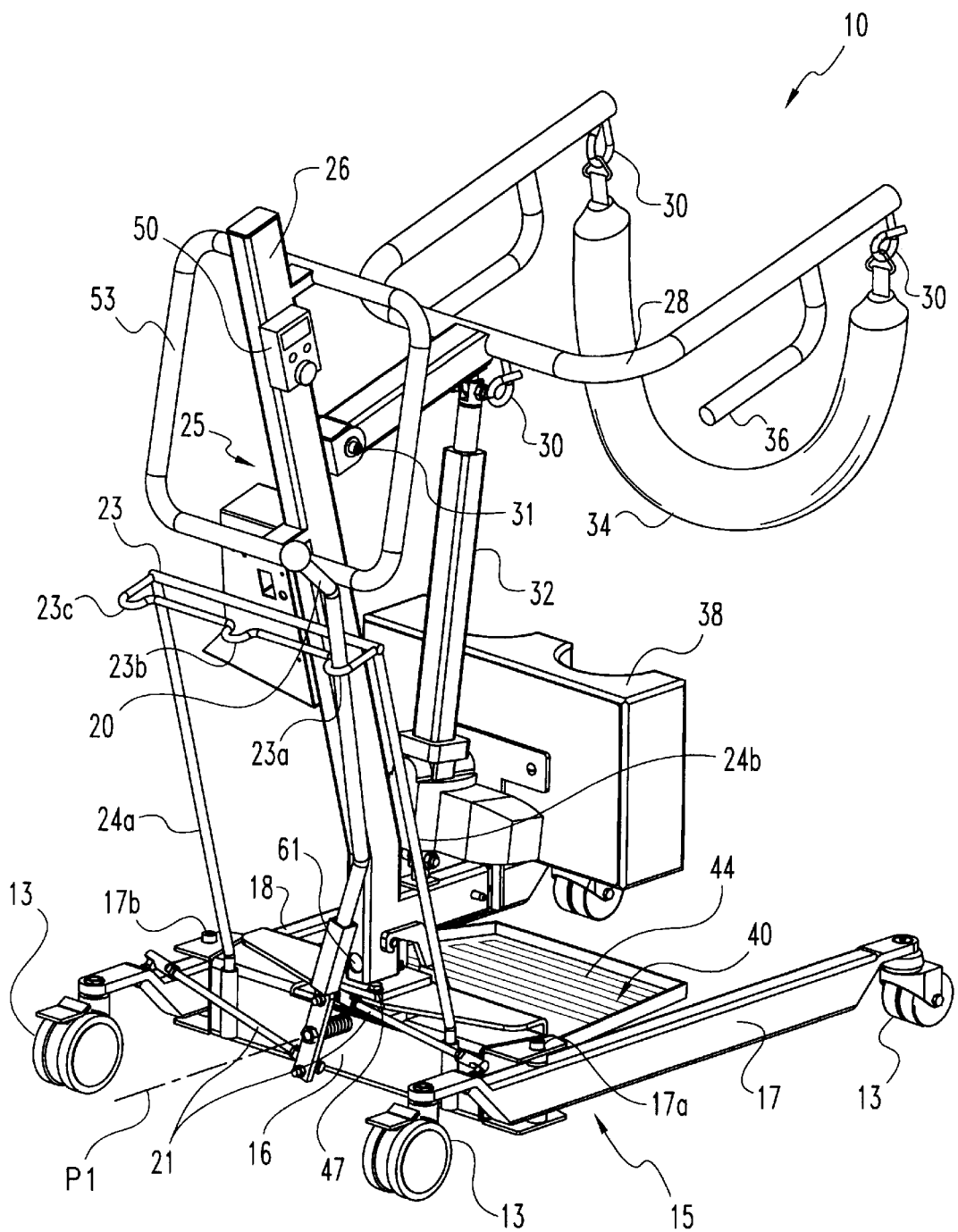
FIG. 2 is a perspective view of an alternate preferred embodiment of the invention.

Referring now to FIGS. 1 and 2, patient stand 10 includes base 15, and mast assembly 25. Base 15 has base tube 16, first leg 17 and second leg 18. Legs 17 and 18 are mounted to controllably pivot about pins 17a and 18a, respectively. Wheels 13 are normally attached to first leg 17 and second leg 18. As is best shown in FIG. 2, leg spreader handle 20 is pivotably mounted around axis P1 and extends from base tube 16. Spreader handle 20 is engaged to spreader bars 21 which are further engaged to first leg 17 and second leg 18. Spreader handle 20 may be pivoted about axis P1 to move first leg 17 and second leg 18 into a spread position, or reversed to narrow their spread. Handle 20 engages cross brace 23 which is connected to base 15 by support rods 24a and 24b. Cross brace 23 includes detents 23a, 23b, 23c corresponding to different spread positions of handle 20.

Mast assembly 25 extends from base tube 16. Near the base of mast assembly 25 foot pad 40 is attached and included. Foot pad 40 has a step area 44, an alignment bracket 43 and mounting hooks 41. Mounting hooks 41 are engaged to hinge pins 42 extending from mast assembly 25.

Mast assembly 25 has a mast 26 extending in a generally vertical direction. Mast 26 is connected to body support member 28 through pivot 31. Body support member 28 has sling hooks 30, and hand-holds 36. Elevation arm or actuator 32 extends from the base of mast assembly 25 to body support member 28. Electric motor 56 engages elevation arm 32, and can be used to extend or retract elevation arm 32 thereby raising or lowering body support member 28. Motor 56 is powered from power supply housing 55 mounted on mast 26. In one preferred embodiment, actuator 32 is an electronic ball screw actuator.

Steering handle 53 is attached to mast 26. Mast 26 further has at least two wiring holes 60 and 61 through which wires may be threaded to load sensor 45 (see FIG. 4), power supply housing 55, motor 56 or display 50. Load display 50 is mounted on mast assembly 25 and is operatively coupled by wiring to load sensor 45. Preferably, load display 50 has a digital readout. Shin pad 38 is mounted on mast assembly 25 facing the patient. A sling 34 may be suspended from sling hooks 30 (see FIG. 2).

Figure 3:
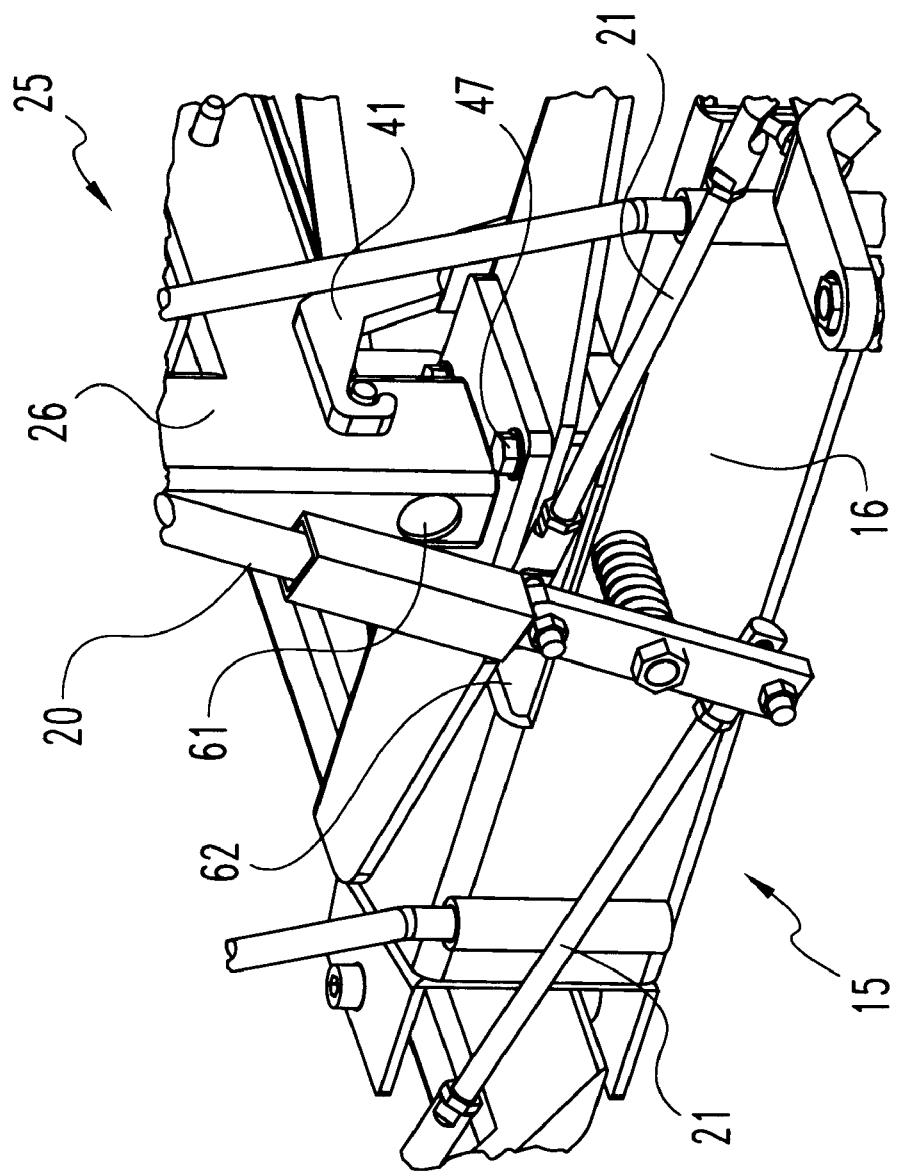
FIG. 3 is a perspective enlarged view of the base portion of a preferred embodiment as shown in FIG. 2.

Referring now to FIG. 3, an enlarged section of base 15 of stand 10 is shown. Leg spreader handle 20 is mounted via a pivot point to base tube 16 of base 15. Spreader bars 21 extend from spreader handle 20 to first leg 17 and second leg 18 as shown in FIG. 2. Spreader handle 20 may be rotated to adjust the stand's stability via the spread of first leg 17 and second leg 18. Base tube 16 has opening 62 adjacent to mast assembly 25 to allow the placement of wires.

Figure 4:
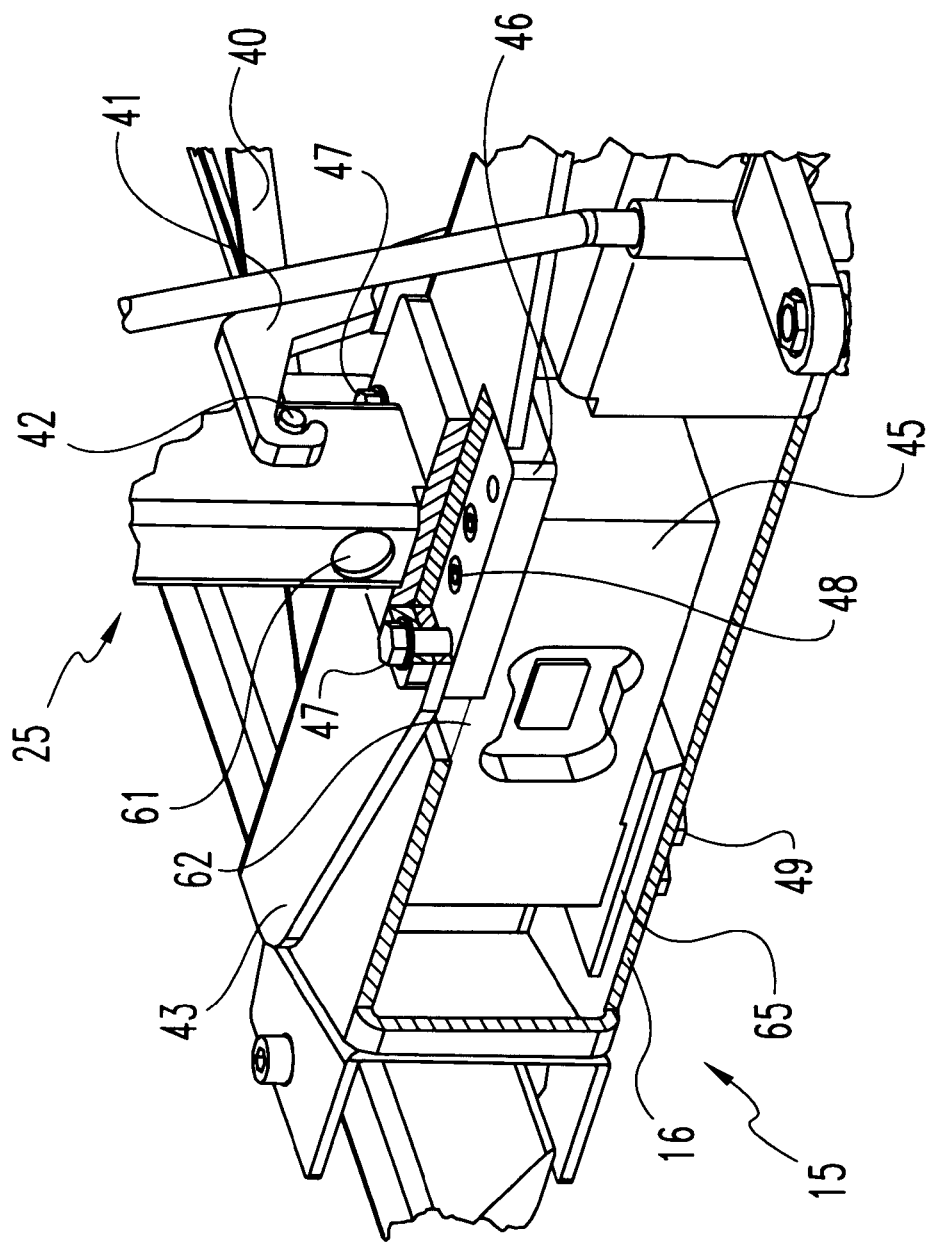
FIG. 4 is a partial, enlarged view of the base portion of a preferred embodiment of the invention as shown in FIG. 2.

Referring to FIG. 4, an enlarged, partial section of base 15 of stand 10 is shown. Mast assembly 25 is mounted to base 15 via mating plate 46 and load sensor 45, preferably a load cell. Mast assembly 25 is secured to mating plate 46 via three bolts 47. Mating plate 46 is secured to load sensor 45 via four socket cap screws 48. Load sensor 45 is situated within base tube 16 and is secured to base tube 16 by four bolts 49. Opening 62 adjacent to mast assembly 25 allows the placement of wires to operatively connect load sensor 45 with load display 50 (see FIG. 2) and power supply housing 55.

Figure 5:
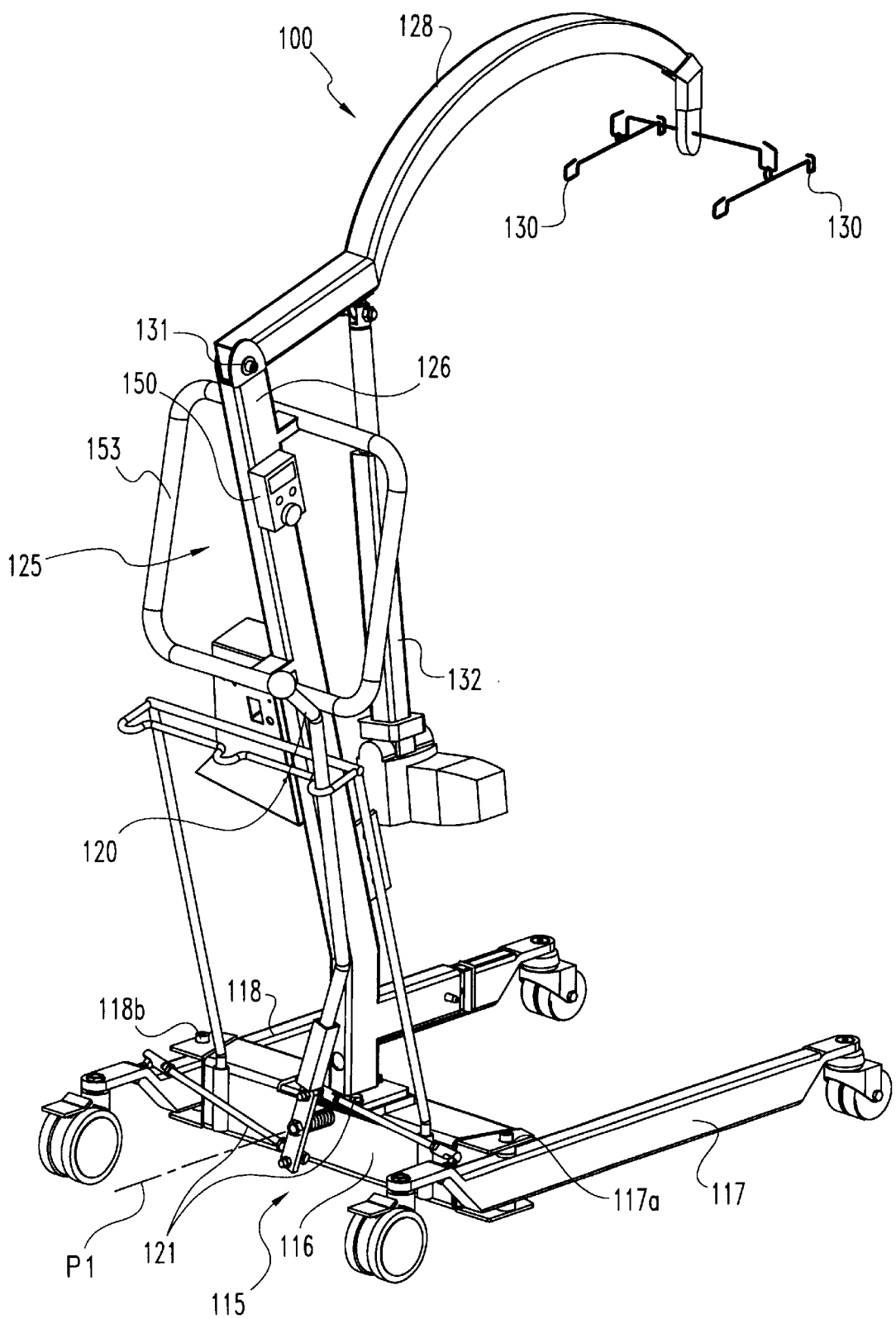
FIG. 5 is a perspective view of an alternate preferred embodiment of the invention.

As illustrated in FIG. 5, an alternate preferred embodiment of the invention is shown. FIG. 5 shows a lift 100 having a base 115 and a mast assembly 125. Base 115 is essentially similar to base 15. Base 115 has first leg 117, second leg 118 and base tube 116. First leg 117 and second leg 118 pivot around pivot points 117a and 118a, respectively. The spread of these legs is controlled by spreader handle 120 pivotably mounted to base tube 116 along axis P1. Spreader bars 121 extend from spreader handle 120 to first leg 117 and second leg 118 as shown. Spreader handle 120 is guided by a cross brace as previously illustrated in FIG. 2.

Mast assembly 125 is similar to mast assembly 25 and extends from base 115 by being mounted to a load sensor (not visible) mounted in base tube 116. Mast assembly 125 has a mast 126 and a mobile arm 128 pivotably mounted via pivot point 131 to mast 126. Sling hooks 130 are suspended from mobile arm 128. Elevation arm 132 is mounted from mast 126 to mobile arm 128 and is used to control the height of mobile arm 128. Additionally, handle 153 and load display 150 are mounted on mast assembly 125.

For all of the illustrated preferred embodiments, to ensure accurate readings, it is important that mast assembly 25 or 125 engage load sensor 45 in a manner such that the full weight of mast assembly 25 or 125 bears on load sensor 45. For this purpose, spacer plate 65 may be inserted between load sensor 45 and base tube 16 to raise load sensor 45. Alternately, the height of mating plate 46 may be varied. For purposes of illustration, a spacer plate of 5/8" is used and a mating plate with a height of 1/4" is used.

The use of various load sensors are envisioned for use with stand 10 or lift 100. These could be mechanical or electrical scales such as strain gauges, transducers, springs or otherwise, with the preferred sensor being a load cell. For purposes of illustration, a Sensortronics Model 60060 load cell with a rated capacity of 1,000 pounds is used. It will also be understood that the use of more than one load sensor where the weight is accumulated and totaled is envisioned. For instance, individual load cells could be mounted to each wheel of the hoist, or parallel load cells could be mounted within the legs of the base.

When the patient stand is used, stand 10 is positioned in front of the patient. Spreader handle 20 is then rotated to spread first leg 17 and second leg 18 and make a more stable base arrangement. The patient's feet are then situated on step 44 of foot pad 40. A preferred belt type sling 34 is arranged around the back of the patient, under the patient's arms and suspended from sling hooks 30. Motor 56 is then engaged to extend elevation arm 32. As elevation arm 32 is extended, it raises support member 28 around pivot 31. This is continued until the patient is completely supported by foot pad 40 or body support member 28 and the desired height is reached.

When the patient lift is used, lift 100 is placed adjacent the patient and stabilized similarly to stand 10. A sling is placed under the patient and suspended from hooks 130. Mobile arm 128 is then raised by elevation arm 132 to raise the patient.

At this point, the patient's weight is completely supported by mast assembly 25 or 125. Mast assembly 25 or 125 engages and is completely supported by load sensor 45. Display 50 or 150 is operatively coupled to load sensor 45 and displays the patient's weight.

It will be appreciated, that display 50 or 150 will need to be calibrated in the stand's unloaded state to compensate for the weight of mast assembly 25 or 125. It will be further understood that mast assembly 25 or 125 may include additional pieces, or certain enumerated pieces may be integrated. For instance, foot pad 40 could be connected in a fixed manner to mast 26.

Alternatively, display 50 or 150 could be relocated on stand 10 or lift 100, or could be remotely hand held and connected to stand 10 or lift 100 via a cord or a transmitter and receiver. It will of course be understood that various alterations such as in wheels, hand-holds, elevation arms or motors may be used as would occur to one skilled in the art.

A specific variation included within this invention includes the use of a support sling with stand 10 which completely supports the weight of the patient. In this embodiment, the patient's feet would not be situated upon foot pad 40. Foot pad 40 could be removed or ignored in this situation. The sling for this embodiment, (not pictured) could have a number of suspension points 30 on body support member 28, and could surround the patient to provide complete support.

A further embodiment of the invention envisions the use of the stand as an assisted walking device for the patient. Support member 28 may be lowered to a comfortable hand level, and foot pad 40 removed so that the patient may comfortably hold hand-holds 36 or support member 28 while walking.

All publications, patents, and patent applications cited in this specification are herein incorporated by reference as if each individual publication, patent, or patent application were specifically and individually indicated to be incorporated by reference and set forth in its entirety herein.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A patient hoist, comprising:
   a base;
   a spacer mounted to said base;
   a load sensor mounted to said spacer;
   a mast assembly extending from said load sensor wherein said mast assembly includes an elevation arm and a body support member.

2. The hoist of claim 1 where said load sensor is a load cell.

3. The hoist of claim 2 wherein said spacer is mounted on said base.

4. The hoist of claim 2 further comprising a footpad attached to said mast assembly.

5. A patient hoist, comprising:
   a base;
   a mast assembly extending from said base wherein said mast assembly includes a mast, a body support member and an elevation arm connected between said mast and said body support member; and,
   a load sensor associated with said mast assembly;
   wherein said load sensor is associated with said mast assembly below the connection of said elevation arm to said mast.

6. The hoist of claim 5 wherein said load sensor is a load cell.

7. The hoist of claim 6 further comprising a display operatively coupled to said load cell and attachable to said mast assembly above said load sensor.

8. The hoist of claim 6 further comprising a footpad attached to said mast assembly to apply loads from said foot pad to said mast assembly above said load sensor.

* * * * *